(12) United States Patent
Stern et al.

(10) Patent No.: US 9,135,477 B2
(45) Date of Patent: Sep. 15, 2015

(54) RADIO FREQUENCY IDENTIFICATION READER WITH ILLUMINATED FIELD OF VIEW

(75) Inventors: Miklos Stern, Woodmere, NY (US); Chandra Nair, Mount Sinai, NY (US); Eric M. Johnson, Brooklyn, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 1717 days.

(21) Appl. No.: 12/220,335

(22) Filed: Jul. 23, 2008

(65) Prior Publication Data

US 2010/0019882 A1 Jan. 28, 2010

(51) Int. Cl.
*G08B 13/14* (2006.01)
*G06K 7/00* (2006.01)
*G06K 7/10* (2006.01)

(52) U.S. Cl.
CPC .......... *G06K 7/0008* (2013.01); *G06K 7/10386* (2013.01); *G06K 7/10544* (2013.01); *G06K 7/10732* (2013.01); *G06K 2207/1011* (2013.01)

(58) Field of Classification Search
USPC ......... 340/572.1, 10.3; 235/439, 435, 472.01, 235/454
See application file for complete search history.

(56) References Cited

U.S. PATENT DOCUMENTS

| | | | |
|---|---|---|---|
| 6,229,445 B1* | 5/2001 | Wack | 340/572.7 |
| 7,077,328 B2* | 7/2006 | Krishnaswamy et al. | 235/472.01 |
| 7,199,719 B2* | 4/2007 | Steinberg | 340/572.8 |
| 2002/0060247 A1* | 5/2002 | Krishnaswamy et al. | 235/472.01 |
| 2005/0258252 A1* | 11/2005 | Winter et al. | 235/472.02 |
| 2005/0269411 A1 | 12/2005 | Vesikivi | |
| 2006/0208076 A1 | 9/2006 | Chiu | |
| 2006/0221363 A1* | 10/2006 | Roth et al. | 358/1.6 |
| 2007/0017997 A1* | 1/2007 | Talley et al. | 235/462.43 |
| 2007/0096909 A1* | 5/2007 | Lally | 340/572.1 |
| 2007/0205288 A1* | 9/2007 | Laser | 235/462.46 |
| 2008/0061937 A1* | 3/2008 | Park | 340/10.1 |
| 2008/0223935 A1* | 9/2008 | Marty et al. | 235/470 |
| 2008/0309494 A1* | 12/2008 | Bahar | 340/572.7 |
| 2009/0273449 A1* | 11/2009 | Tuttle | 340/10.4 |

OTHER PUBLICATIONS

International Search Report Dated Sep. 23, 2009.

* cited by examiner

*Primary Examiner* — Naomi Small

(57) ABSTRACT

A radio frequency identification (RFID) reader for, and method of, reading an RFID tag to obtain data, includes an RFID module supported by a housing and including an antenna for propagating an electromagnetic field over a field of view, as well as an illuminator supported by the housing for visibly illuminating the field of view to enable an operator to see the illuminated field of view and whether the RFID tag is within the illuminated field of view.

19 Claims, 5 Drawing Sheets

RADIO FREQUENCY IDENTIFICATION READER WITH ILLUMINATED FIELD OF VIEW

DESCRIPTION OF THE RELATED ART

Radio frequency identification (RFID) is known in the field of automatic data capture. A transponder, known generally as a tag, is attached to an object and communicates wirelessly with an RFID reader. RFID technology is used in a variety of applications including retail, industrial, transportation, tracking, security, animal identification and individual identification. Transfer of data via RFID technology may be used, for example, for indicating the presence of the object, such as in electronic article surveillance (EAS), for obtaining data associated with the object, or for identifying the object. In an automatic identification system, the tag is typically programmed with unique information, such as encoded data including an identifying code. The RFID reader includes an antenna which emits radio carrier signals to activate the tag and read data from it, and a decoder for decoding the data read. The tag responds to the signal by modulating the carrier signal in accordance with the encoded data.

RFID technology allows for non-contact reading. The RFID reader may be a mobile reader, such as a handheld reader, or a stationary hands-free reader such as a reader fixedly located in a tunnel, a door portal or a toll booth. The electromagnetic field generated by the antenna may be constant or activated by an actuator such as a sensor or a trigger. Advantages to RFID technology include non-contact reading without the need for line-of-sight interrogation.

In use of the RFID reader, an operator may either present the tag on the object to a stationary RFID reader, and hold the object at least momentarily steady in a "presentation" mode, or may bring or aim a handheld RFID reader to or at the tag on the object. The choice depends on operator preference, the size and/or weight and/or bulkiness of the object, or on the layout of a workstation in which the RFID reader is used.

As advantageous as the known RFID readers have been in reading data, they have not proven to be altogether satisfactory in use. The range or field of view of the RFID antenna is not visible to the operator. In the presentation mode, the operator does not know whether he or she is holding the object tag within the field of view of the RFID antenna. In the handheld mode, the operator does not know whether he or she is aiming the field of view of the RFID antenna at the object tag. Also, the operator does not know whether more than one object tag is within the field of view of the RFID antenna and, if so, which one of the object tags was read.

Some of the known RFID readers have indicator lights or auditory beepers that light up or beep, respectively, to indicate that a tag has been read. Other known RFID readers have counters that indicate how many tags have been read. Yet, none of these known RFID readers advise the operator where the field of view of the RFID antenna is, whether or not the object tag lies within the field of view, and which tag out of multiple tags was actually read. The primary complaint of RFID reader operators is that they are working "blind" and do not know what tag was read.

SUMMARY OF THE INVENTION

One feature of the present invention resides, briefly stated, in a radio frequency identification (RFID) reader for, and a method of, reading an RFID tag to obtain data. The reader could be configured in a hands-free and/or a handheld mode of operation. The reader advantageously includes a housing having a handle for the handheld mode. The reader may also have a base for supporting the housing on a support surface for the hands-free mode. Preferably, the base is connected to the housing in both the handheld and hands-free modes by being pivotably connected to the handle. Also, the housing is preferably configured with a gun-shaped configuration, and a manually actuatable trigger mechanism is provided on the housing at a location underlying an operator's fingers when the operator holds the handle in the operator's hand.

In accordance with a preferred embodiment, the RFID reader includes an RFID module supported by the housing. The RFID module is operative for reading an RFID tag or transponder to obtain data. The RFID module includes an antenna which emits radio frequency carrier signals to activate the tag and read the data from it, and a decoder for decoding the data read. The tag responds to the signal by modulating the carrier signal in accordance with the encoded data. The RFID antenna is operative for propagating an electromagnetic field over a range or field of view, and an illuminator is supported by the housing for visibly illuminating the field of view to enable an operator to see the illuminated field of view and whether the RFID tag is within the illuminated field of view.

Thus, the field of view of the RFID antenna is, in contrast to the prior art, now visible to the operator. The operator now knows whether he or she is holding the RFID tag within the field of view of the RFID antenna. In the handheld mode, the operator now knows whether he or she is aiming the field of view of the RFID antenna at the RFID tag. Also, the operator now knows whether more than one RFID tag is within the field of view of the RFID antenna and, if so, which one of the RFID tags was read.

The illuminator could come from various sources. For example, if the housing includes a laser scanning module for electro-optically reading indicia, especially one- and/or two-dimensional symbols, each symbol including elements of different light reflectivity, e.g., bars and spaces, then the illuminator could be derived from one or more electro-optical components from the laser scanning module. These components include a laser for generating a laser beam, and a scanner for scanning, in either the handheld mode or the hands-free mode, the laser beam in a scan pattern, typically comprised of one or more scan lines, across the indicia during reading. The laser scanning module also includes a light detector for detecting light of variable intensity returning from the symbol, and for generating an electrical signal indicative of the intensity of the detected return light. The laser scanning module further includes signal processing circuitry for processing the electrical analog signal generated by the light detector, and a digitizer for converting the analog signal to a digital signal for subsequent decoding by a controller or programmed microprocessor. The symbol is read when the signal is successfully decoded, and the product bearing the symbol is thus automatically identified.

The illuminator could also be derived from one or more electro-optical components of an imaging module, also for electro-optically reading indicia, especially one- and/or two-dimensional symbols, if such an imaging module is provided in the housing. The electro-optical components of the imaging module include a one- or two-dimensional, solid-state imager. The imager has an array of image sensors operative, together with an imaging lens assembly, for capturing light, in either the handheld mode or the hands-free mode, from a one- or two-dimensional symbol or target through a window or presentation area during the reading. Preferably, the array is a charge coupled device (CCD) or a complementary metal oxide semiconductor (CMOS) device array. Electronic circuitry is operative for producing electrical signals indicative of the light captured by the array, and a controller or programmed microprocessor is operative for processing the electrical signals to read the symbol. The product bearing the symbol is thus automatically identified by image capture.

The imaging module includes an illuminating light source for illuminating the symbol during the reading with illumination light directed from the illuminating light source through the presentation area. The illuminating light source comprises one or more light emitting diodes (LEDs). The illuminator is especially useful when the reader is operated in low light or dark ambient environments, but could equally well be used at normal indoor lighting levels. An aiming light source, together with aiming optics, can be used to generate an aiming light pattern useful to locate the symbol prior to reading. Thus, the illuminator of the present invention can utilize the illuminating light source and/or the aiming light source of the imaging module.

The illuminator need not borrow components from any laser scanning module or imaging module, but could be constituted from a dedicated illumination light source, such as a laser or an LED, for generating visible illumination light, and an optical element for optically modifying the visible illumination light to cover the illuminated field of view, especially the entire field of view. The optical element may include a lens, a diffractive optical element, a refractive optical element, a holographic element, or a diffusion element, and especially any element that spreads the illumination light to entirely cover the illuminated field of view.

Advantageously, a trigger mechanism is supported by the housing and is manually actuatable by the operator to initiate actuation of the illuminator and the RFID module. The controller is operatively connected to the trigger mechanism, the illuminator and the RFID module, for controlling the illuminator and the RFID module, preferably for simultaneous operation in response to actuation of the trigger mechanism. A switch, either separate from, or integrated with, the trigger mechanism is supported by the housing, for manually switching the illuminator between on and off states.

In the case of the hands-free reader, the tag is swiped past, or presented to, the illuminated field of view of the reader and, in the case of the handheld terminal, the illuminated field of view of the reader itself is moved and aimed at, or presented to, the tag. In the preferred embodiment, the reader may be used for tracking inventory or shipments.

Another aspect of the invention still further resides in a radio frequency identification (RFID) method of reading an RFID tag to obtain data, performed by propagating an electromagnetic field over a range or field of view of an antenna of an RFID module, and by visibly illuminating the field of view with an illuminator to enable an operator to see the illuminated field of view and whether the RFID tag is within the illuminated field of view.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
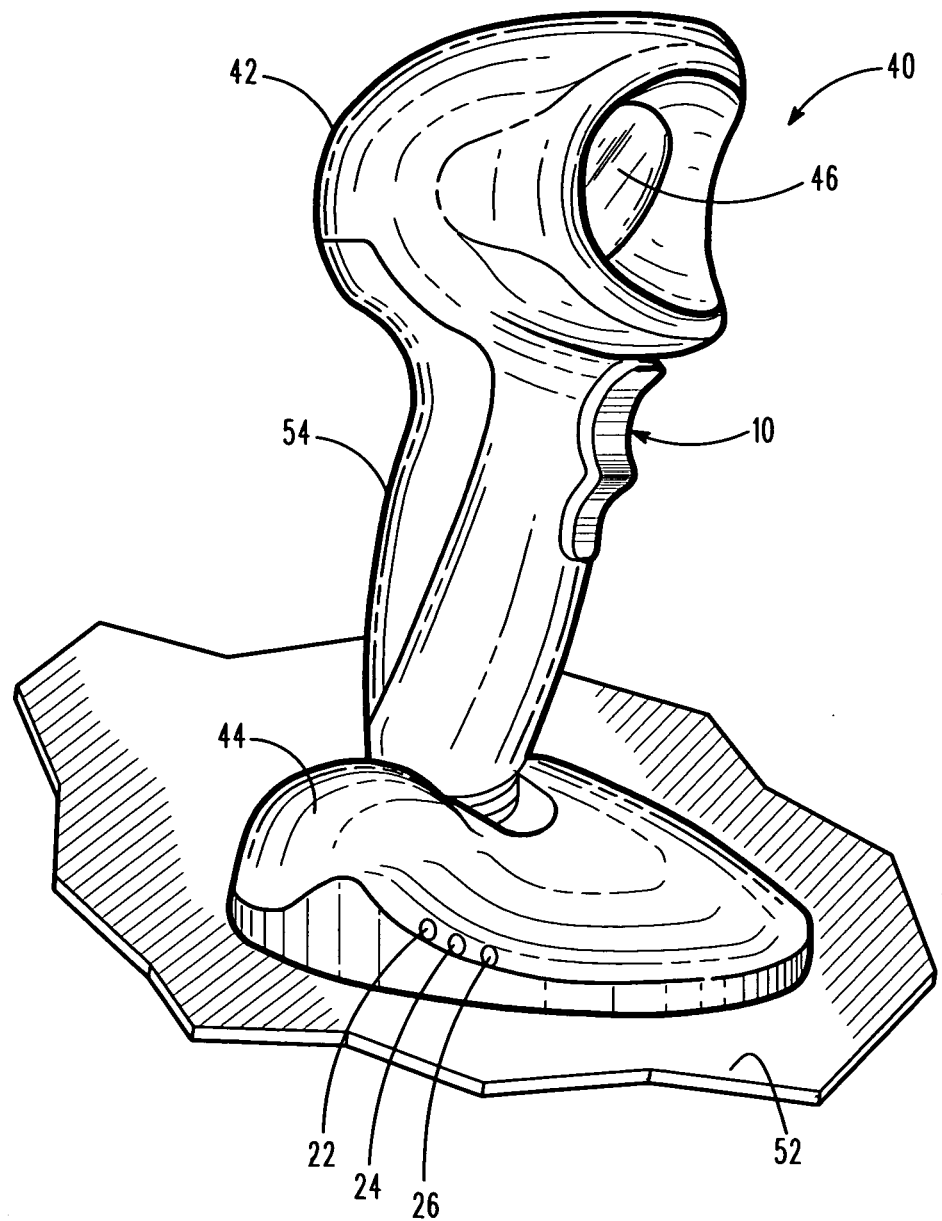
FIG. 1 is a perspective view of one embodiment of an RFID reader operative in either a handheld mode, or a hands-free mode, for capturing data in accordance with this invention.

Reference numeral 40 in FIG. 1 generally identifies an RFID data capture reader having a gun-shaped housing 42 connected to a base 44. The base 44 rests on a countertop or analogous support surface 52 and serves for supporting the housing 42. The reader 40 can thus be used in a hands-free mode as a stationary workstation in which products bearing RFID tags or transponders are presented to, or slid or swiped past, a presentation area or window 46. The gun-shaped housing 42 also has a handle 54 that can be picked up by an operator off the countertop 52 and held in the operator's hand in a handheld mode.

A trigger mechanism 10 is located on the gun-shaped housing 42 at a location underlying an operator's fingers when the operator holds the handle 54 in the operator's hand in the handheld mode. As described in detail below, the trigger mechanism 10 is manually depressed to initiate data capture, e.g., reading of the tag. In the illustrated embodiment of FIG. 1, the handle 54 is permanently and pivotably connected to the base 44 in both the handheld and hands-free modes for pivoting movement about a generally horizontal pivot axis, that is generally parallel to, and elevated above, the countertop 52. The housing 42 is adjustably tiltable forward and back about the pivot axis in the hands-free mode to aim the presentation area 46 at the tag to be read.

Figure 2:
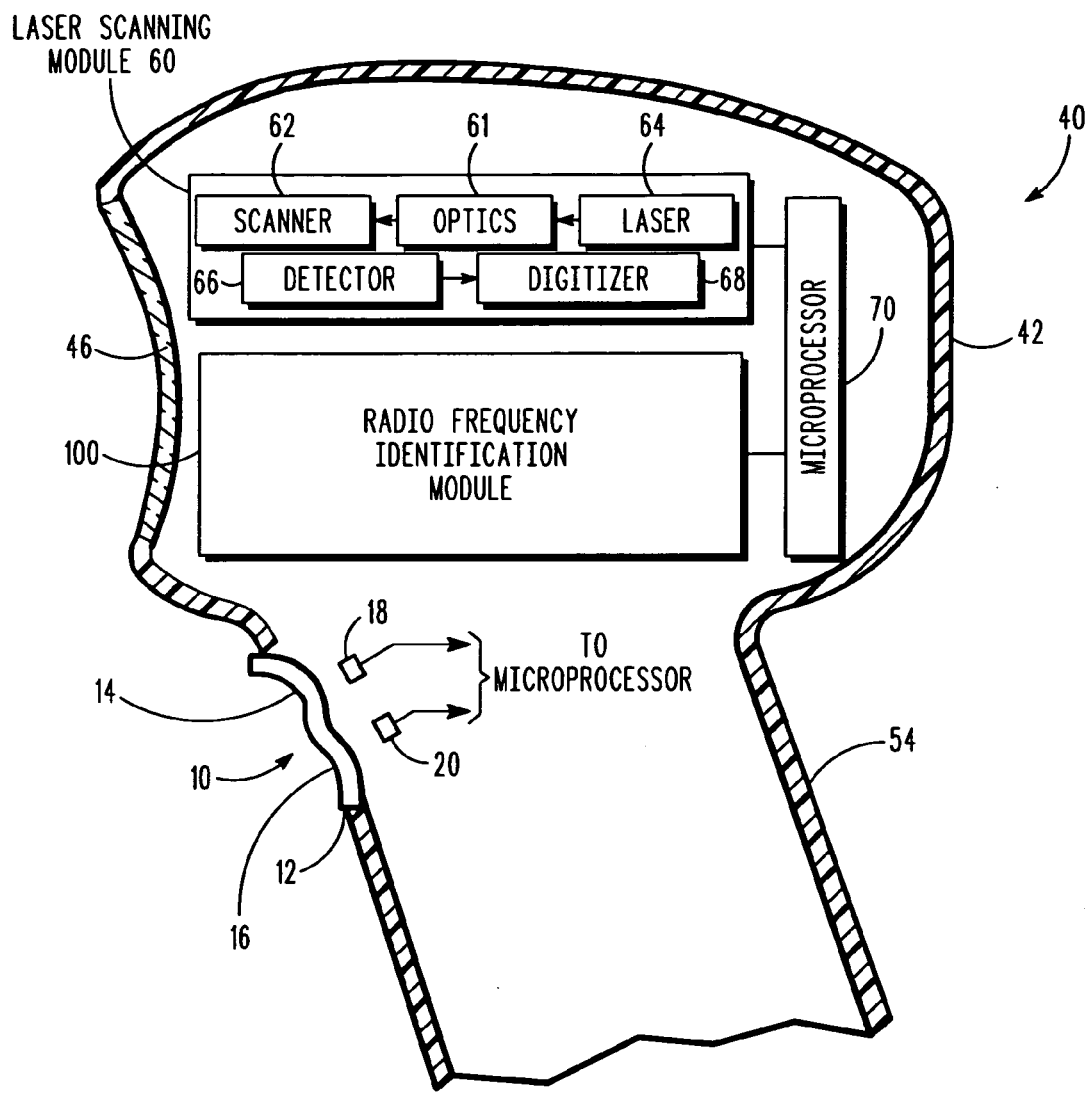
FIG. 2 is a broken-away, sectional view of a housing of the reader of FIG. 1 schematically depicting a laser scanning module and an RFID module in the housing.
Figure 3:
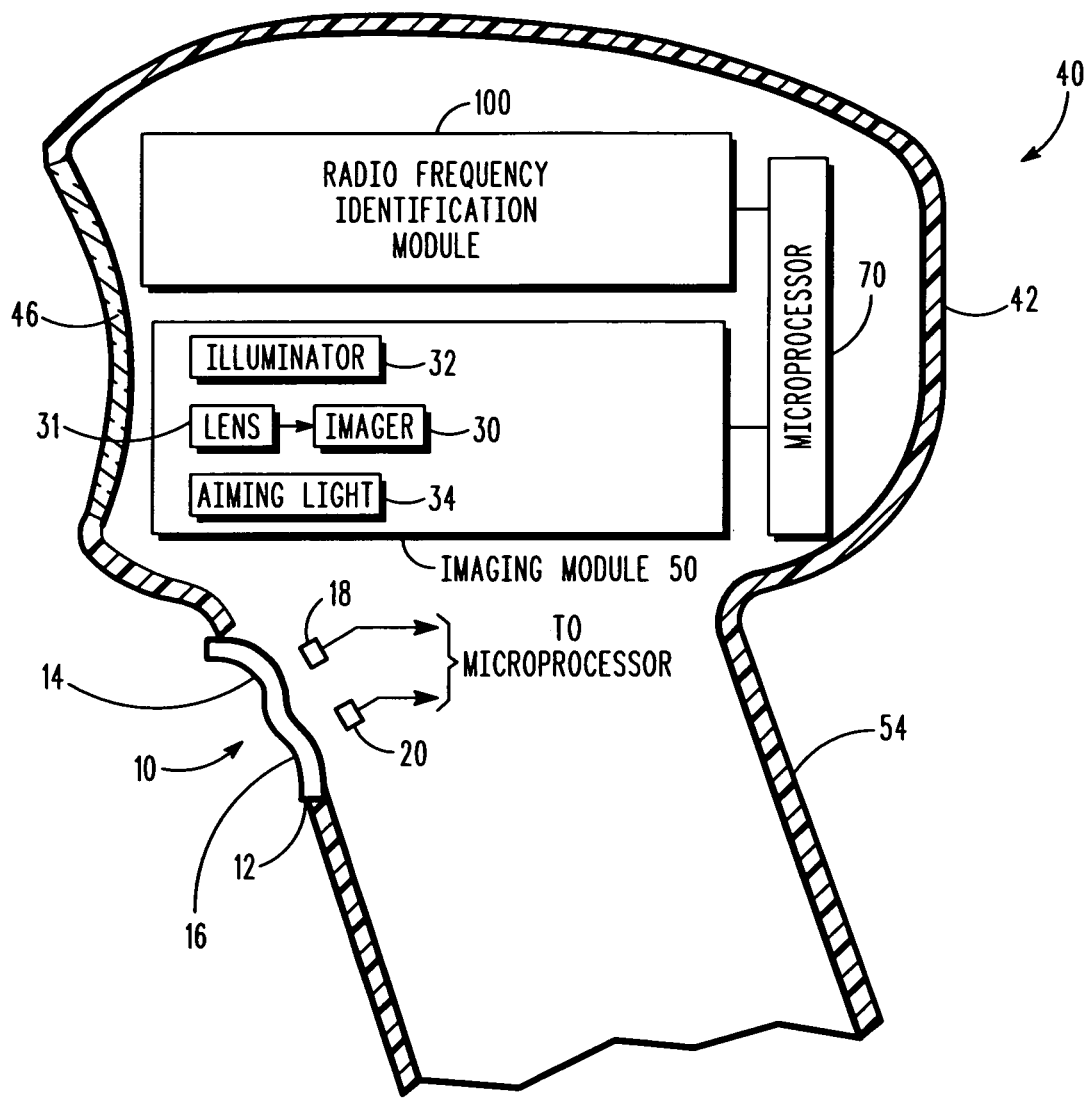
FIG. 3 is a view analogous to FIG. 2 depicting an imaging module and an RFID module in the housing.
Figure 4:
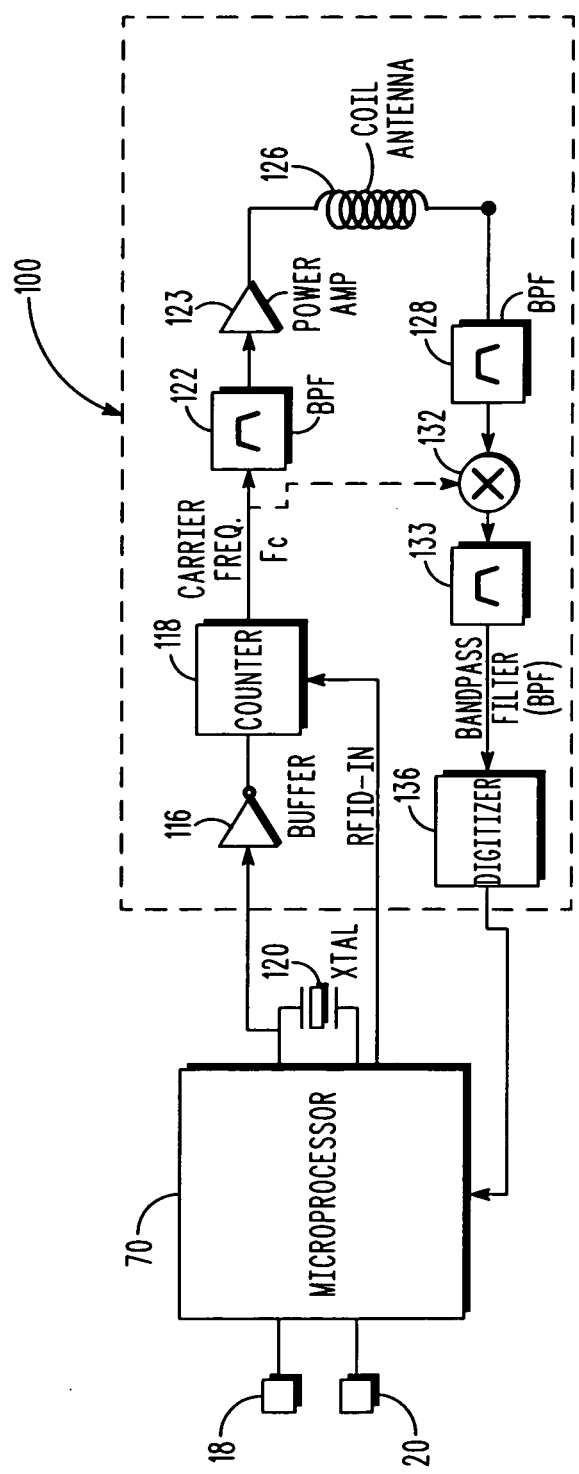
FIG. 4 is a circuit schematic depicting the RFID module of FIG. 3.

As schematically illustrated in FIGS. 2-3, the reader 40 has an RFID module 100 supported in the housing 42. As shown in FIG. 4, a crystal clock (XTAL) 120 provides a clock signal to a microprocessor or controller 70. A buffer amplifier 116 amplifies and processes the clock signal from clock 120 and provides a signal to a counter 118. The controller 70 also provides an RFID enable (RFID-EN) signal to the counter 118 which enables the RFID circuit. Thereafter, the counter signal at a carrier frequency (Fc) is filtered by a bandpass filter (BPF) 112, amplified by a power amplifier 123, and then propagated as an electromagnetic radio frequency (RF) field via an antenna 126. Antenna 126 then determines, either through inductive coupling, through RF propagation, or other suitable RF method, whether there is an RFID tag or transponder in the RF field of view or range propagated by the antenna 126, and, if so, the characteristics of the interrogated RFID tag. The antenna need not necessarily be a coil, as illustrated.

In operation, the antenna 126 transmits a data signal based on the RF information to a bandpass filter 128 that then transmits the signal to a multiplier 132. The multiplier 132 samples the signal at a frequency rate controlled by the counter 118 and then transmits the sampled signal to another bandpass filter 133 which pre-processes the data signal and transmits it to a digitizer 136, after which it preferably is transmitted as a suitable digital signal to the controller 70 that processes the digitized signal from the digitizer 68 into data descriptive of the tag.

As previously discussed, the range or field of view of the RFID antenna 126 is not visible to the operator. In the presentation mode, the operator does not know whether he or she is holding the tag within the field of view of the RFID antenna 126. In the handheld mode, the operator does not know whether he or she is aiming the field of view of the RFID antenna 126 at the tag. Also, the operator does not know whether more than one tag is within the field of view of the RFID antenna 126 and, if so, which one of the tags was read.

Hence, in accordance with one aspect of this invention, an illuminator is supported by the housing 42 for visibly illuminating the field of view to enable an operator to see the illuminated field of view and whether the RFID tag is within the illuminated field of view. Since the field of view of the RFID antenna 126 is now visible to the operator, the operator now knows whether he or she is holding the RFID tag within the field of view of the RFID antenna 126. In the handheld mode, the operator now knows whether he or she is aiming the field of view of the RFID antenna 126 at the RFID tag. Also, the operator now knows whether more than one RFID tag is within the field of view of the RFID antenna 126 and, if so, which one of the RFID tags was read.

The illuminator could come from various sources. For example, if the housing 42 includes a laser scanning module 60, as shown in FIG. 2, for electro-optically reading indicia, especially one- and/or two-dimensional symbols, each symbol including elements of different light reflectivity, e.g., bars and spaces, then the illuminator could be derived from one or more electro-optical components from the laser scanning module 60.

The laser scanning module 60 includes a scanner 62 for scanning at least one of a laser beam from a laser 64 and a field of view of a light detector 66 in a scan pattern, typically comprised of one or more scan lines, across the indicia during reading. The laser scanning module 60 may also include optics 61 for focusing the laser beam to have a large depth of field, and a digitizer 68 for converting an electrical analog signal generated by the detector 66 into a digital signal for subsequent decoding. In operation of the laser scanning module 60, a controller 70 energizes the laser 64 to emit the laser beam through the presentation area 46, and energizes the scanner 62 to sweep the laser beam in the scan pattern. The controller 70 also processes the digitized signal from the digitizer 68 into data descriptive of the symbol. In this embodiment, the laser 64 and the scanner 62 serve as the illuminator for visibly illuminating the field of view of the antenna 126.

The illuminator could also be derived from one or more electro-optical components of an imaging module 50, as illustrated in FIG. 3, also for electro-optically reading indicia, especially one- and/or two-dimensional symbols, if such an imaging module 50 is provided in the housing 42. The imaging module 50 includes a one- or two-dimensional, solid-state imager 30 having an array of image sensors operative, together with an imaging lens assembly 31, for capturing light from a one- or two-dimensional symbol or target through the presentation area 46 during the reading to produce an electrical signal indicative of a captured image for subsequent decoding. Preferably, the array is a CCD or a CMOS array having a 752×480 resolution (wide VGA), although other resolution sizes are possible.

The imaging module 50 includes an illumination light source 32 for illuminating the symbol during the reading with illumination light directed from the illumination light source through the presentation area 46. The illumination light source comprises one or more light emitting diodes (LEDs). The illumination light source 32 is especially useful when the reader 40 is operated in low light or dark ambient environments, but could equally well be used at normal indoor lighting levels. An aiming light source 34 may also be provided for projecting an aiming light pattern or mark on the symbol prior to reading. In operation of the imaging module 50, the microprocessor or controller 70 sends a command signal to pulse the illuminator LEDs 32 for a short time period, say 500 microseconds or less, and energizes the imager 30 during an exposure time period of a frame to collect light from a target symbol during said time period. A typical array needs about 33 milliseconds to read the entire target image and operates at a frame rate of about 30 frames per second. The array may have on the order of one million addressable image sensors. In this embodiment, the illumination light source 32 and/or the aiming light source 34 serve as the illuminator for visibly illuminating the field of view of the antenna 126.

If the reader 40 comprises both the laser scanning module 60 and the imaging module 50 in the same housing 42, then they preferably share the same controller 70 and the same presentation area 46 or window. In this embodiment, any one of the laser 64 and the scanner 62, the illumination light source 32, or the aiming light source 34 could serve as the illuminator for visibly illuminating the field of view of the antenna 126.

Figure 5:
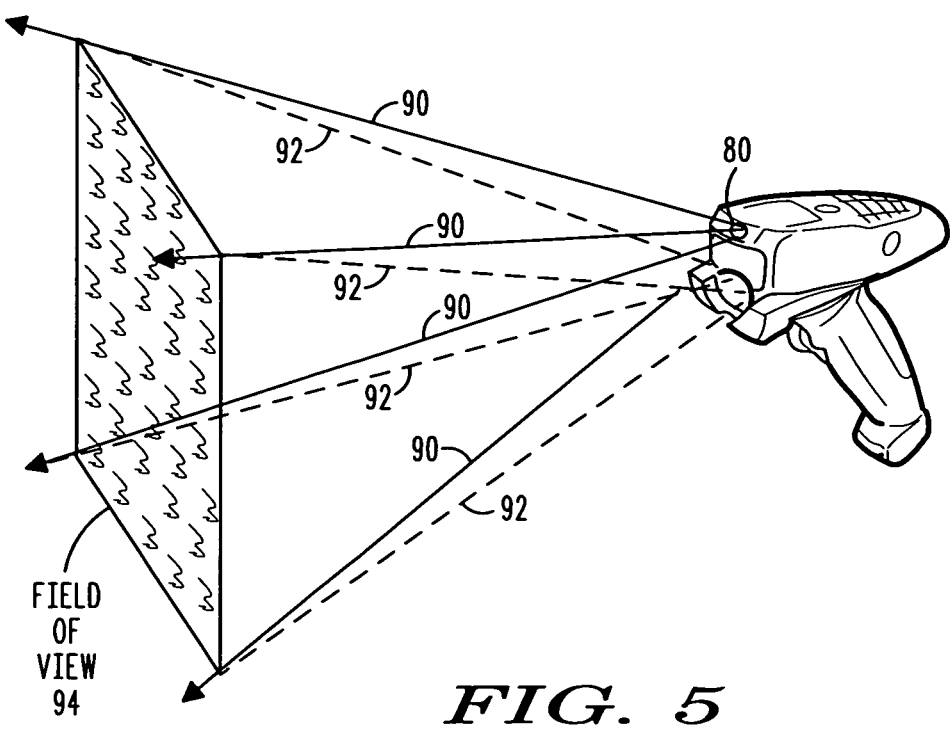
FIG. 5 is a perspective view of another embodiment of a handheld RFID reader depicting an illuminated field of view in accordance with this invention.
Figure 6:
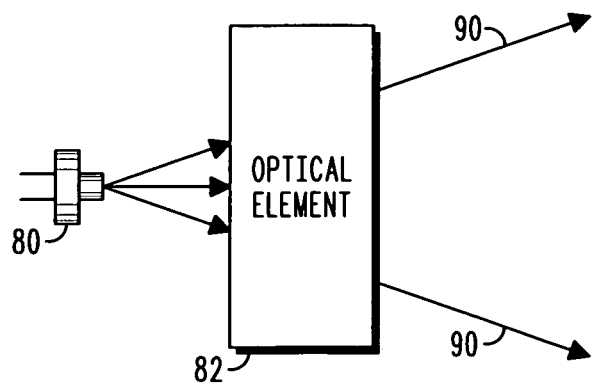
FIG. 6 is a perspective view of an illuminator circuit for use in the RFID reader of FIG. 5.

The illuminator need not borrow components from any laser scanning module 60 or imaging module 50, but could be constituted from a dedicated illumination light source 80, such as a laser or an LED, as shown in FIGS. 5-6, for generating visible illumination light, as illustrated by the solid conical lines 90 in FIG. 5, and an optical element 82 for optically modifying the visible illumination light to cover the illuminated field of view 94 shown by stippling in FIG. 5 and bounded by dashed conical lines 92, especially the entire field of view of the antenna 126. The optical element 82 may include a lens, a diffractive optical element, a refractive optical element, a holographic element, or a diffusion element, and especially any element that outwardly spreads and diverges the illumination light to entirely cover the illuminated field of view 94. The optical element 82 spreads the illumination light over a solid, conical angle that preferably matches the solid, conical angle of the field of view of the RFID module.

In accordance with another aspect of this invention, the aforementioned trigger mechanism 10 is manually actuatable by the operator to initiate actuation of the modules 50, 60, 100 in the handheld mode with different triggering actions unique to the respective modules. The trigger mechanism 10 includes a trigger 12 depressable by one finger, e.g., the index finger, to initiate actuation of one of the modules, e.g., the module 60, by another finger, e.g., the middle finger, to initiate actuation of another of the modules, e.g., the reader 50, and simultaneously by both fingers, e.g., the index and middle fingers, to initiate actuation of still another of the modules, e.g., the module 100. Preferably, the trigger 12 includes one arcuate notch 14 to receive the one finger, and another arcuate notch 16 to receive the other finger.

The trigger mechanism 10 also includes one switch 18 that is switched when the trigger 12 is depressed by the one finger, and another switch 20 that is switched when the trigger 12 is depressed by the other finger. Both switches 18, 20 are preferably simultaneously switched when the trigger 12 is depressed by the both fingers. The trigger mechanism 10 generates different control signals in response to the different triggering actions. The controller 70 for the modules 50, 60,

100 is operatively connected to the trigger mechanism 10, for controlling the modules in response to receiving the control signals.

When the RFID module 100 is operative by depressing the trigger in one of the triggering actions, the illuminator is likewise preferably simultaneously operative. The illuminator could also be made operative prior to activating the RFID module by a separate triggering action. In addition, a switch, either separate from, or integrated with, the trigger mechanism 10 is supported by the housing 42, for manually switching the illuminator between on and off states. Such a switch could be implemented by one of the switches 18, 20.

Another aspect of this invention, especially useful in the hands-free mode, resides in a plurality of different indicators 22, 24, 26, each dedicated to a respective module 50, 60, 100 for indicating a successful reading of the respective module. For example, an auditor y beeper that generates different sounds, or visible lights that generate different colors, can be used to advise the operator which module 50, 60, 100 successfully decoded a symbol/tag.

It will be understood that each of the elements described above, or two or more together, also may find a useful application in other types of constructions differing from the types described above. Thus, readers having different configurations can be used. For example, the reader of FIG. 5 is similar to that of FIG. 1, except that it has no base.

While the invention has been illustrated and described as an arrangement for, and a method of, illuminating the field of view of an RFID reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A radio frequency identification (RFID) reader for reading an RFID tag to obtain data, comprising:
    a housing;
    an RFID module supported by the housing and including an antenna for propagating an electromagnetic field over a field of view; and
    an illuminator supported by the housing for visibly illuminating substantially all of the field of view over which the electromagnetic field propagates to enable an operator to see the illuminated field of view and whether the RFID tag is within the illuminated field of view, wherein the illuminator is configured to provide visible light over a solid, conical angle substantially matching a solid, conical angle of the field of view of the RFID module.

2. The reader of claim 1, wherein the illuminator includes a laser for generating a visible laser beam, and a scanner for scanning the visible laser beam in a scan pattern over the illuminated field of view; and wherein the laser and the scanner are components of a laser scanning module supported by the housing and operative for electro-optically reading indicia.

3. The reader of claim 1, wherein the illuminator includes one of an aiming light source for generating a visible aiming light beam, and an illumination light source for generating visible illumination light; and wherein the one of the aiming light source and the illumination light source is a component of an imaging module supported by the housing and operative for electro-optically reading indicia.

4. The reader of claim 1, wherein the illuminator includes an illumination light source for generating visible illumination light, and an optical element for optically modifying the visible illumination light to entirely cover the illuminated field of view.

5. The reader of claim 1, and a trigger mechanism supported by the housing and manually actuatable by the operator to initiate actuation of the illuminator and the RFID module.

6. The reader of claim 5, and a controller operatively connected to the trigger mechanism, the illuminator and the RFID module, for controlling the illuminator and the RFID module for simultaneous operation in response to actuation of the trigger mechanism.

7. The reader of claim 1, and a switch supported by the housing, for manually switching the illuminator between on and off states.

8. The reader of claim 1, wherein the housing has a handle to be held by the operator in a handheld mode of operation, and a base for supporting the housing on a support surface during a hands-free mode of operation.

9. A radio frequency identification (RFID) reader for reading an RFID tag to obtain data, comprising:
    RFID means for propagating an electromagnetic field over a field of view; and
    means for visibly illuminating substantially all of the field of view over which the electromagnetic field propagates to enable an operator to see the illuminated field of view and whether the RFID tag is within the illuminated field of view, wherein the means for visibly illuminating is configured to provide visible light over a solid, conical angle substantially matching a solid, conical angle of the field of view of the RFID means.

10. A radio frequency identification (RFID) method of reading an RFID tag to obtain data, comprising the steps of:
    propagating an electromagnetic field over a field of view of an antenna of an RFID module; and
    visibly illuminating substantially all of the field of view over which the electromagnetic field propagates with an illuminator to enable an operator to see the illuminated field of view and whether the RFID tag is within the illuminated field of view, wherein the field of view is visibly illuminated with visible light over a solid, conical angle substantially matching a solid, conical angle of the field of view of the RFID module.

11. The method of claim 10, wherein the illuminating step is performed by generating a visible laser beam with a laser, and scanning the visible laser beam with a scanner in a scan pattern over the illuminated field of view; and providing the laser and the scanner as components of a laser scanning module operative for electro-optically reading indicia.

12. The method of claim 10, wherein the illuminating step is performed by generating one of a visible aiming light beam with an aiming light source, and visible illumination light with an illumination light source; and providing the one of the aiming light source and the illumination light source as a component of an imaging module operative for electro-optically reading indicia.

13. The method of claim 10, wherein the illuminating step is performed by generating visible illumination light with an illumination light source, and optically modifying the visible illumination light with an optical element to entirely cover the illuminated field of view.

14. The method of claim 10, and manually actuating a trigger mechanism by the operator to initiate actuation of the illuminator and the RFID module.

15. The method of claim 14, and controlling the illuminator and the RFID module for simultaneous operation in response to actuation of the trigger mechanism.

16. The method of claim 10, and manually switching the illuminator between on and off states.

17. The method of claim 10, and supporting the illuminator and the RFID module with a housing, and configuring the housing with a handle to be held by the operator in a handheld mode of operation, and configuring the housing with a base for supporting the housing on a support surface during a hands-free mode of operation.

18. The reader of claim 1, wherein the illuminator comprises a plurality of optical and electrical components collectively configured to provide visible light to substantially all of the field of view over which the electromagnetic field propagates, and wherein the plurality of optical and electrical components are configured based upon a type of the antenna.

19. The reader of claim 18, wherein the illuminator is disposed within an imaging module, and the reader further comprising a laser scanning module comprising a laser for scanning a laser beam for electro-optically reading indicia.

* * * * *